(12) United States Patent
Lin et al.

(10) Patent No.: US 11,145,854 B2
(45) Date of Patent: Oct. 12, 2021

(54) PROCESS FOR PREPARING CATHODE OF LITHIUM BATTERY AND LITHIUM BATTERY HAVING THE CATHODE

(71) Applicant: Zhongyin (Ningbo) Battery Co., Ltd., Ningbo (CN)

(72) Inventors: Caoping Lin, Ningbo (CN); Zhua Ma, Ningbo (CN); Ruirui Liu, Ningbo (CN)

(73) Assignee: Zhongyin (Ningbo) Battery Co., Ltd., Ningbo (CN)

( * ) Notice: Subject to any disclaimer, the term of this patent is extended or adjusted under 35 U.S.C. 154(b) by 149 days.

(21) Appl. No.: 16/701,743

(22) Filed: Dec. 3, 2019

(65) Prior Publication Data

US 2021/0083267 A1 Mar. 18, 2021

(30) Foreign Application Priority Data

Sep. 16, 2019 (CN) .......................... 201910872986.4

(51) Int. Cl.
| | |
|---|---|
| *H01M 4/1395* | (2010.01) |
| *H01M 4/133* | (2010.01) |
| *H01M 4/134* | (2010.01) |
| *H01M 4/1393* | (2010.01) |
| *H01M 10/0525* | (2010.01) |

(52) U.S. Cl.
CPC ......... *H01M 4/1395* (2013.01); *H01M 4/133* (2013.01); *H01M 4/134* (2013.01); *H01M 4/1393* (2013.01); *H01M 10/0525* (2013.01)

(58) Field of Classification Search
CPC ...... H01M 4/134; H01M 4/742; H01M 4/669; H01M 4/04; H01M 4/139
See application file for complete search history.

(56) References Cited

U.S. PATENT DOCUMENTS

2020/0280063 A1* 9/2020 Tiruvannamalai .... H01M 4/134

FOREIGN PATENT DOCUMENTS

| CN | 101728511 A | 6/2010 |
|---|---|---|
| CN | 102157736 A | 8/2011 |

* cited by examiner

*Primary Examiner* — Ladan Mohaddes
(74) *Attorney, Agent, or Firm* — Innovation Capital Law Group; Vic Lin

(57) ABSTRACT

A process for preparing a cathode of a lithium battery, having the following steps: (a) Longitudinally punching a metal band to form irregular filamentous holes, horizontally stretching the metal band, and performing compaction to give the metal net irregular filamentous holes; (b) After the metal net is cleaned and dried, processing the metal net surface by a laser less than 5W, of 500-1000W, and of 10-100W sequentially; and (c) Coating the metal net, having the surface processed with lasers, with a prepared cathode paste, and drying, pressing, and cutting the metal net to obtain a battery cathode.

10 Claims, 2 Drawing Sheets

PROCESS FOR PREPARING CATHODE OF LITHIUM BATTERY AND LITHIUM BATTERY HAVING THE CATHODE

BACKGROUND OF THE INVENTION

Technical Field

The invention belongs to the technical field of preparation of lithium batteries and relates to a process for preparing a cathode of a lithium battery and a lithium battery having the cathode.

Description of Related Art

The development of electronic technologies, communication products, digital products, small testing instruments, and other products has exerted a direct influence on the development of power supply products used for these products. Chemical power supplies, commonly referred to as batteries, have been widely used. The electronic and digital technologies are gradually developing towards miniaturization, multiple functions, and portability, and accordingly, power batteries thereof should have high specific energy, high specific power and long service life and be convenient use. Primary dry batteries which are small in size and convenient to carry, use and replace have also been widely used.

There are many types of primary dry batteries commonly such as alkaline zinc-manganese batteries, ordinary zinc-manganese batteries, zinc-silver batteries, zinc-air batteries, lithium-manganese batteries, and lithium-ion batteries. In daily life, the alkaline zinc-manganese batteries and the ordinary zinc-manganese batteries are applied mostly widely. However, the ordinary zinc-manganese batteries and the alkaline zinc-manganese batteries cannot meet the requirements of some electrical appliances anymore in the aspects of discharge platforms, discharge stability, battery storage and heavy-load work, and lithium-iron disulfide batteries are able to overcome these shortcomings.

Lithium-iron disulfide batteries are primary lithium batteries using cubic pyrite as a cathode active material and lithium metal as a cathode active material. Compared with other batteries of the same model, lithium-iron disulfide batteries have a large quality specific capacity and volume specific capacity. Lithium-iron disulfide batteries have a large battery capacity, a high discharge platform, stable discharge, a wide application temperature range, good storage performance, and a nominal voltage of 1.5V, and can be exchanged with the alkaline zinc-manganese batteries and primary carbon-zinc batteries which are widely applied on the current market, thus being widely applied to instruments such as cameras, MP3s, hearing aids, portable players, video cameras, industrial PC, computer RAM and CMOS circuit memory-support power supplies, radio communication stations, various military communication stations, medical devices, hand-held communication devices, timers, and counters.

As the primary lithium batteries, lithium-iron disulfide batteries have many advantages. However, the fabrication process of lithium-iron disulfide batteries, especially the fabrication process of the cathode of lithium-iron disulfide batteries, is complex. At present, the cathode of lithium-iron disulfide batteries is typically fabricated as follows: active materials are mixed to form a paste to be smeared on aluminum foil, then the paste is dried, and afterwards, a cathode piece is manufactured. This process has the following shortcomings: the cathode piece is likely to breakage when coated with the paste, the adhesion of the cathode active material and a current collector is low, and the cathode active material may fall off from the surface of the current collector in the storage or usage process, and consequentially, the battery performance is affected. Besides, in the case where the coated cathode is stored for a long time, the cathode active material may corrode the aluminum foil in the presence of water and air, which leads to embrittlement of the cathode piece, and consequentially, the fabrication of the battery is affected, and the cathode piece cannot be used for making the battery anymore in a severe case.

BRIEF SUMMARY OF THE INVENTION

The objective of the invention is to overcome the shortcomings of lithium batteries in the prior by providing a method for preparing a cathode of a lithium battery. The method improves the adhesion of a cathode active material and a metal net through irregular filamentous hole stretching and repeated laser processing. The invention further provides a lithium battery prepared with the cathode and having better electrochemical performance.

One objective of the invention is fulfilled through the following technical solution:

A process for preparing a cathode of a lithium battery comprises the following steps:

(a) Longitudinally punching a metal band to form irregular filamentous holes, horizontally stretching the metal band, and performing compaction to make a metal net having the irregular filamentous holes;

(b) After the metal net is cleaned and dried, processing the surface of the metal net with a laser less than 5 W, a laser of 500-1000 W, and a laser of 10-100 W sequentially; and (c) Coating the metal net having the surface processed with the lasers with a prepared cathode paste, and drying, pressing, and cutting the metal net to obtain a battery cathode.

Preferably, a metal is one of stainless steel, platinum, aluminum, nickel, copper, and nickel-plated stainless steel, and after being compacted, the metal net has a thickness of 0.05-0.15 mm.

Preferably, the irregular filamentous holes longitudinally punched in the metal band have a volume accounting for 60%-85% of the total volume of the metal band; and after being horizontally stretched, the irregular filamentous holes have a volume accounting for 80%-92% of the total volume of the metal band.

Preferably, the scanning speed of a laser less than 5 W is 500-1000 mm/s, the scanning speed of a laser of 500-1000 W is 400-800 mm/s, and the scanning speed of a laser of 10-100 W is 50-100 mm/s.

Preferably, before the metal net having the surface processed with the lasers is coated with the paste, the surface of the metal net is primarily spray-coated with a conductive carbon material having an average particle size of 300-500 nm, is then spray-coated with a conductive carbon material having an average particle size of 10-50 nm after being dried, and is then coated with the paste after being dried.

Preferably, a primary spray-coating thickness is 3-7 μm, and a secondary spray-coating thickness is 2-5 μm.

Preferably, the cathode paste contains by mass: 65%-75% of cathode active materials, 2%-5% of conductive agents, 2%-5% of bonding agents, and 20%-30% of solvents.

Preferably, the cathode active materials are pyrite.

Preferably, the conductive agents are one or more of acetylene black, graphite, ketjen black, carbon fibers, and carbon nanotubes.

Preferably, the bonding agents are one or more of polyvinylidene fluoride, polytetrafluoroethylene, styrene butadiene rubber, sodium carboxymethylcellulose, polyacrylonitrile, and polyacrylate.

Another objective of the invention is fulfilled through the following technical solution:

A lithium battery comprises an anode, a cathode, an electrolyte solution, a diaphragm, and a shell, wherein the cathode is prepared through the above-mentioned process, and the anode is a metal sheet or a metal net which is made from a lithium metal or a lithium alloy.

Compared with the prior art, the invention has the following beneficial effects:

1. When the metal net having the irregular filamentous holes is coated with the cathode paste, the cathode active materials are mutually bonded through the irregular filamentous holes in the metal net and are embedded into a metal frame, so that the adhesion between the cathode materials and the adhesion between the cathode materials and the metal frame are effectively improved; and the irregular filamentous holes formed longitudinally allow the paste to be pressed into gaps of the metal net more easily, and the metal coated with the paste has better ductility and toughness.

2. An oil film of the metal net is removed with the laser less than 5 W, an oxide layer, exposed after the oil film is removed, on the surface of the metal net is removed with the laser of 500-1000 W, then small dotted pits are formed in the surface of the metal net with the laser of 10-100 W; through laser processing in this sequence, oil stains and the oxide layer on the surface of the metal net are removed, and the surface of the metal net is roughened, so that the conductivity of the metal net and the adhesion between the cathode materials and the metal net are improved.

3. The surface of the metal net is spray-coated with two conductive carbon films having different particle sizes, the conductive carbon material adopted in the secondary spray-coating process has the average particle size obviously smaller than that of the conductive carbon material adopted in primary spray-coating and can fill in gaps of a conductive carbon layer formed in the primary spray-coating to form a compact conductive protection layer so as to further isolate the cathode active materials from the metal net.

DETAILED DESCRIPTION OF THE INVENTION

Hereinafter, a process for preparing a cathode of a lithium battery and a lithium battery using the cathode are expounded with reference to embodiments. However, these embodiments are illustrative ones, and are not intended to limit the contents of the invention. Besides, the accompanying drawings in this article are used for better explaining the contents of the invention only and are not used for limiting the protection scope of the invention.

In some embodiments of the invention, the process for preparing a cathode of a lithium battery comprises the following steps:

(a) A metal band is longitudinally punched to form irregular filamentous holes and is horizontally stretched, and compaction is performed to make a metal net having the irregular filamentous holes;

(b) After the metal net is cleaned and dried, the surface of the metal net is processed with a laser less than 5 W, a laser of 500-1000 W, and a laser of 10-100 W sequentially; and (c) The metal net having the surface processed with the lasers is coated with a prepared cathode paste, and is then dried, pressed and cut to obtain a battery cathode, wherein the cathode paste includes cathode active materials, conductive agents, bonding agents, and solvents.

Figure 1:
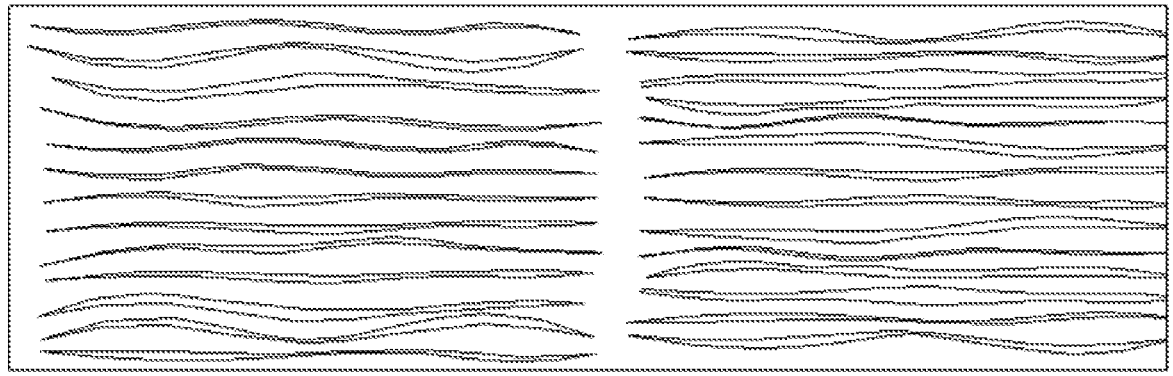
FIG. 1 is a schematic diagram of irregular filamentous holes longitudinally punched in a metal band of the invention.
Figure 2:
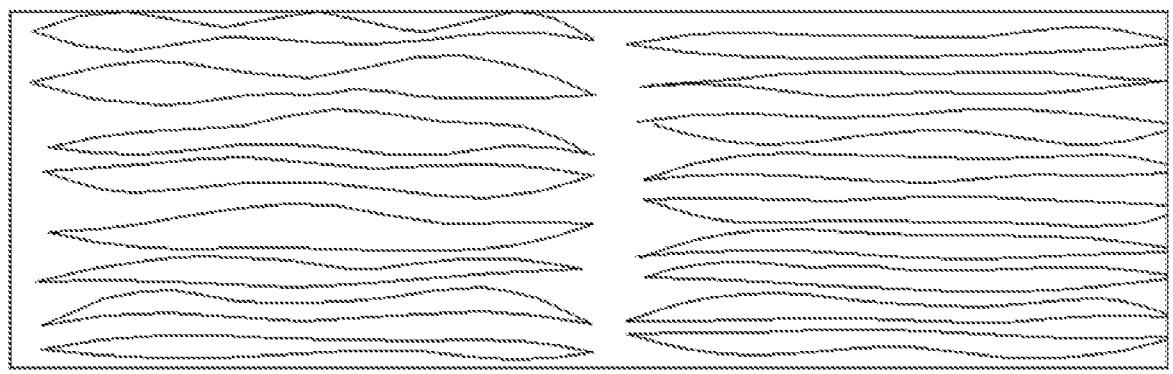
FIG. 2 is a schematic diagram of a metal net having irregular filamentous holes after being horizontally stretched of the invention.

In the invention, the winding direction of the metal net in the preparation process of a battery is defined as a longitudinal direction, and a direction perpendicular to a longitudinal axis is defined as a horizontal direction. After being cleaned and cut to an appropriate shape, the metal band is punched in the longitudinal direction to form the irregular filamentous holes; and as shown in FIG. 1, the holes are in a filamentous shape, extend in the longitudinal direction, and are irregularly arrayed. The filamentous holes longitudinally extend to better improve the longitudinal flexibility of the metal net; and when the battery is fabricated, the winding direction of the metal net for fabricating a battery pole piece is consistent with the longitudinal direction of the filamentous holes of the metal net, so that the cathode active materials are unlikely to fall off during winding of a cathode piece containing certain cathode active materials. Then the filamentous holes are stretched in the horizontal direction, as shown in FIG. 2, to expand by a certain size in the horizontal direction. After the filamentous holes are horizontally stretched, the volume occupied by the filamentous holes is further enlarged, the mechanical performance of the metal net is improved, and the formed metal net has better tensile strength and toughness and is not prone to deformation, so that the quality of a battery is guaranteed. Then the metal net is rolled to have a certain thickness, and the consistency of the thickness of the metal net is guaranteed through rolling, and the uniformity and consistency of cathode paste coating in the later stage are better facilitated.

When the metal net having the irregular filamentous holes is coated with the cathode paste, the cathode active materials are mutually bonded through the irregular filamentous holes in the metal net and are embedded into a metal frame, so that the adhesion between the cathode materials and the adhesion between the cathode materials and the metal frame are effectively improved. From the viewpoint of material coating, these cathode active materials are mutually bonded in the holes, so that fewer requirements are put forward to the material of a coated substrate, and a coating can be thicker. Traditionally, the increase of the thickness of the coating will inevitably reduce the adhesion between the coating and the coated substrate. However, such hole-based bonding can increase the thickness of the coating without causing drastic reduction of the adhesion, so that the capacity of the battery is increased.

Compared with rhombuses, circles, rectangles, crosses, or other shapes regularly arrayed in the metal net in the prior art, the irregular filamentous hole structure of the metal net allows the cathode paste to be pressed into gaps of the metal net more easily during past filling, so that the metal net coated with the paste has better ductility and toughness.

Figures 3, 4:
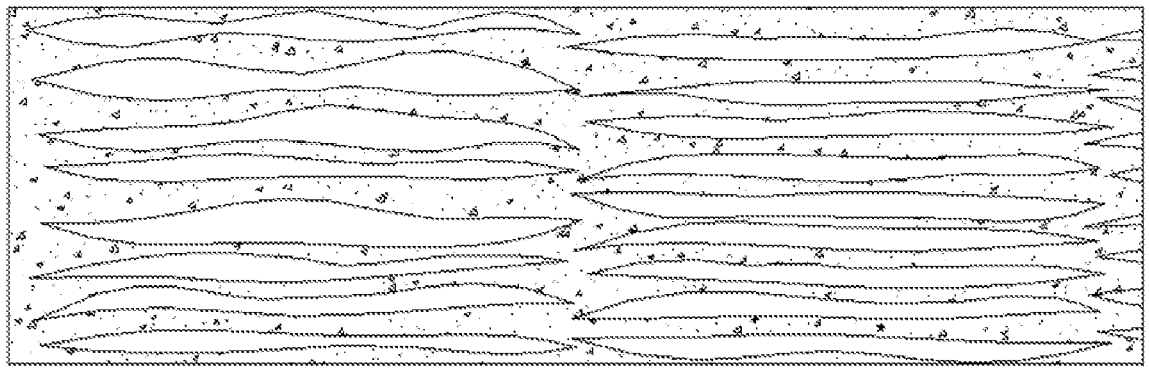
FIG. 3 is a schematic diaphragm of the metal net having the irregular filamentous holes after laser treatment of the invention.
FIG. 4 is a schematic diaphragm of the metal net, having the irregular filamentous holes, of which the surface is spray-coated with a conductive carbon material of the invention.

An oil layer on the surface of the compacted metal net is cleaned with a solution containing any surfactants capable of removing oil stains in an immersion cleaning manner or a spray cleaning manner for 2-10 minutes, so that stains generated on the surface of the metal net in the processing process are removed. Then the surface is processed with lasers of different intensities. Particularly, the surface is processed with a laser less than 5 W first at a preferred scanning speed of 500-1000 mm/s, so that the oil strains which are attached to the external surface of the metal net in the processing process and are difficult to remove only with the surfactants can be removed effectively by means of low-intensity laser processing. Then the surface of the metal net is further processed with a laser of 500-1000 W at a preferred scanning speed of 400-800 mm/s to remove a thin oxide layer generated on the external surface of the metal net in the high-temperature processing process, so that the surface resistance of the metal surface is reduced. Finally, the surface is ablated with a laser of 10-100 W at a preferred scanning speed of 50-100 mm/s to form small dotted pits in the surface of the metal net having the filamentous holes, as shown in FIG. 3 which shows a simulated diagram of the small dotted pits in the surface of the metal net, so that the surface roughness of the metal net meets Ra>5 μm (Ra represents an average value of the absolute value of the distance from the pits to the center line on the surface profile of the metal net within a sampling length of 10 mm). The surface roughness of the metal net increases the contact area between the cathode active materials and the metal net, reduces the resistance at a material junction, and improves the bonding strength between the cathode active materials and the metal net. In the three times of laser processing, all parameters except for the power and the scanning speed are identical.

In the invention, the sequence of surface processing with the lasers of different intensities in turns cannot be changed; and the oxide layer on the surface of the metal net can be exposed only if an oil film is removed with the laser less than 5 W first, then the oxide layer is removed with the laser of 500-1000 W, and afterwards, the small dotted pits are formed in the surface of the metal net with the laser of 10-100 W. Through laser processing, the oil stains and the oxide layer on the surface of the metal net are removed, and the surface of the metal net is roughened, so that the conductivity of the metal net and the adhesion between of the cathode materials and the metal net are improved.

Finally, the uniformly-mixed cathode paste is delivered to a coating machine to be smeared on the metal net; after being dried and pressed, the metal net coated with the cathode materials has a preferred thickness of 0.2-0.6 mm and is then made into the cathode piece through cutting, tab welding, and other processes.

In a preferred embodiment of the invention, a metal is one of stainless steel, platinum, aluminum, nickel, copper, and nickel-plated stainless steel, and the thickness of the compacted metal net is 0.05-0.15 mm. The thickness of the compacted metal net is preferably 0.08 mm.

In the preferred embodiment of the invention, the irregular filamentous holes longitudinally punched in the metal band have a volume accounting for 60%-85% of the total volume of the metal band and preferably have a volume accounting for about 70% of the total volume of the metal band; and after being horizontally stretched, the irregular filamentous holes have a volume accounting for 80%-92% of the total volume of the metal band and preferably have a volume accounting for about 90% of the total volume of the metal band.

In a preferred embodiment of the invention, before the cathode paste is smeared on the surface, processed with lasers, of the metal net, the surface of the metal net is primarily spray-coated with a conductive carbon material having an average particle size of 300-500 nm first, is then spray-coated with a conductive carbon material having an average particle size of 10-50 nm after being dried, and is then coated with the paste after being dried.

It should be noted that "particle size" in this article refers to the maximum value of the distance between any two points on a contour line of a material particle observed by means of an observation device such as SEM and TEM. "Average particle size" refers to an average value calculated according to the particle sizes of material particles observed in dozens of fields of view by means of the observation device such as SEM and TEM.

By spray-coating the metal net with the conductive carbon materials, the internal resistance of the metal net can be reduced, the material conductivity can be improved; and a formed conductive carbon layer can effectively isolate the direct contact between the active node materials and the metal net, so that the risk of corrosion of the cathode active materials to aluminum foil is reduced, and the probability of corrosion of an electrolyte solution to the metal net in the using process of the battery is reduced. The conductive carbon material, adopted in the secondary spray-coating process, having the average particle size of 10-50 nm can fill in gaps of the conductive carbon layer formed by the primary spray coating to form a compact conductive protection layer so as to further isolate the cathode active materials from the metal net and to protect the surface of the metal net against oxidization when the cathode is processed at a high temperature. The conductive carbon materials are preferably conductive graphite or conductive carbon black.

The metal net is spray-coated with the conductive carbon materials preferably as follows: an emulsus solution consisting of the conductive carbon materials, the surfactants, the bonding agents, and the solvents is ultrasonically sprayed to the surface of the metal net to form a uniform carbon film.

The weight percentages of the conductive carbon materials, the surfactants, the bonding agents, and the solvents are respectively 50%-80%, 1%-5%, 1%-5%, and 20%-40%.

The surfactants are hexadecyl trimethyl ammonium bromide, 1-hexadecylsulfonic acid sodium salt, sodium dodecyl benzene sulfonate, and polyethylene glycol-400, and the like; the bonding agents are polyvinylidene fluoride, polytetrafluoroethylene, styrene butadiene rubber, sodium carboxymethylcellulose, polyacrylonitrile, and the like; and the solvents are N, N-dimethylformamide, tetrahydrofuran, dimethyl sulfoxide, and the like. The above ingredients are enumerative ones only, and are not intended to limit the contents of the invention.

In the preferred embodiment of the invention, the thickness of a primarily spray-coated carbon film is 3-7 μm, and the thickness of a secondly spray-coated carbon film is 2-5 μm. The thicknesses of the carbon films are controlled by means of the spray quantity and the spray speed of the emulsus solution.

FIG. 4 shows a schematic diagram of the metal net, having the irregular filamentous holes, of which the surface is spray-coated with the conductive carbon materials. The carbon films are uniformly formed on all the surface, except for filamentous hole parts, of the metal net.

In a preferred embodiment of the invention, the cathode active materials are pyrite, and the weight percentages of the pyrite, the conductive agents, the bonding agents, and the solvents are respectively 65%-75%, 2%-5%, 2%-5%, and 20%-30%. The ingredients are uniformly mixed to prepare the half-dry paste for coating.

The conductive agents are preferably one or more of acetylene black, graphite, ketjen black, carbon fibers, and carbon nanotubes. The bonding agents are one or more of polyvinylidene fluoride, polytetrafluoroethylene, styrene butadiene rubber, sodium carboxymethylcellulose, polyacrylonitrile, and polyacrylate. The solvents include, but are not limited to, N-methyl pyrrolidone, acetone, isobutanol, tetrahydrofuran, dimethyl sulfoxide, and the like.

In some embodiments of the invention, a lithium battery is provided and comprises an anode, a cathode, an electrolyte solution, a diaphragm, and a shell, wherein the cathode is prepared through the above-mentioned process, and the anode is a metal sheet or a metal net which is made from a lithium metal or a lithium alloy. The anode, the diaphragm, the cathode, and the diaphragm are laminated and wound to form a battery cell which is stored in the battery shell, and the electrolyte solution is injected into the battery shell which is then sealed, so that the lithium battery is prepared.

The diaphragm is a polyethylene micro-porous diaphragm or a polypropylene micro-porous diaphragm and has a thickness of 15-100 μm.

The electrolyte solution is prepared from an electrolyte and an organic solvent, wherein the electrolyte includes, but is not limited to, lithium iodide, lithium trifluoromethanesulfonate, bis(trifluoromethane)sulfonimide lithium salt, lithium bromide, lithium perchlorate, lithium hexafluorophosphate, and the like, and the organic solvent includes, but is not limited to, propylene carbonate, ethylene carbonate, dimethoxyethane, dioxolame, sulfolane, and the like.

Hereinafter, the technical solution of the invention is further expounded and explained in combination with the embodiments. However, these embodiments are only illustrative ones, and are not intended to limit the contents of the invention. Unless otherwise stated, raw materials used in the following embodiments of the invention are common raw materials in the art, and methods adopted in the embodiments are conventional methods in the art.

Embodiment 1

A stainless steel metal band is longitudinally punched to form irregular filamentous holes and is then horizontally stretched, and compaction is performed to make a stainless steel net having the irregular filamentous holes, and the thickness of the metal net is 0.08 mm; the compacted stainless steel net is immersed into an aqueous solution containing 1-hexadecylsulfonic acid sodium salt for 3 minutes, and after the stainless steel net is dried, the surface of the stainless steel net is processed with a 3 W laser at a scanning speed of 800 mm/s first, is then processed with a 700 W laser at a scanning speed of 500 mm/s, and is finally processed with a 50 W laser at a scanning speed of 70 mm/s.

Then an emulsus solution consisting of 70 wt % of conductive graphite having an average particle size of 400 nm, 1 wt % of hexadecyl trimethyl ammonium bromide, 3 wt % of polyvinylidene fluoride, and 26 wt % of N, N-dimethylformamide is ultrasonically sprayed to the surface of the metal net to form a uniform carbon film, conductive graphite having an average particle size of 30 nm and containing the same ingredients of the same contents as mentioned above is sprayed to the surface of the metal under the same spraying condition after the carbon film is dried, wherein a primary spray-coating thickness is 6 μm, and a secondary spray-coating thickness is 3 μm.

The processed metal net is coated with a prepared cathode paste and is then dried, pressed and dried to obtain a battery cathode. The cathode paste is prepared by mixing 70 wt % of pyrite, 2 wt % of acetylene black, 3 wt % of polytetrafluoroethylene, and 25 wt % of N, N-dimethylformamide. The dried and pressed metal net coated with cathode materials has a thickness of 0.38 mm, and a cathode piece formed through cutting has a size of 180 mm*42 mm (length*width).

Embodiment 2

A metal band is longitudinally punched to form irregular filamentous holes and is then horizontally stretched, and compaction is performed to make a metal net having the irregular filamentous holes, and the thickness of the metal net is 0.08 mm; the compacted stainless steel net is immersed into an aqueous solution containing 1-hexadecylsulfonic acid sodium salt for 4 minutes, and after the stainless steel net is dried, the surface of the stainless steel net is processed with a 4 W laser at a scanning speed of 900 mm/s first, is then processed with a 700 W laser at a scanning speed of 450 mm/s, and is finally processed with a 30 W lase at a scanning speed of 80 mm/s.

Then an emulsus solution consisting of 75 wt % of conductive graphite having an average particle size of 450 nm, 1.5 wt % of 1-hexadecylsulfonic acid sodium salt, 2.5 wt % of polytetrafluoroethylene, and 22 wt % of dimethyl sulfoxide is ultrasonically sprayed to the surface of the metal net to form a uniform carbon film, conductive graphite having an average particle size of 20 nm and containing the same ingredients of the same contents as mentioned above is sprayed to the surface of the metal under the same spraying condition after the carbon film is dried, wherein a primary spray-coating thickness is 5 μm, and a secondary spray-coating thickness is 2 μm.

The processed metal net is coated with a prepared cathode paste and is then dried, pressed and dried to obtain a battery cathode. The cathode paste is prepared by mixing 75 wt % of pyrite, 2.5 wt % of graphite, 3.5 wt % of sodium carboxymethylcellulose, and 19 wt % of N, N-dimethylformamide. The dried and pressed metal net coated with cathode materials has a thickness of 0.35 mm, and a cathode piece formed through cutting has the size of 180 mm*42 mm (length*width).

Embodiment 3

A metal band is longitudinally punched to form irregular filamentous holes and is then horizontally stretched, and compaction is performed to make a metal net having the irregular filamentous holes, and the thickness of the metal net is 0.08 mm; the compacted stainless steel net is immersed into an aqueous solution containing 1-hexadecylsulfonic acid sodium salt for 5 minutes, and after the stainless steel net is dried, the surface of the stainless steel net is processed with a 2 W laser at a scanning speed of 600 mm/s first, is then processed with a 800 W laser at a scanning speed of 400 mm/s, and is finally processed with a 60 W laser at a scanning speed of 60 mm/s.

Then an emulsus solution consisting of 65 wt % of conductive graphite having an average particle size of 350 nm, 2 wt % of 1-hexadecylsulfonic acid sodium salt, 2 wt % of sodium carboxymethylcellulose, and 31 wt % of tetrahydrofuran is ultrasonically sprayed to the surface of the metal net to form a uniform carbon film, conductive graphite having an average particle size of 10 nm and containing the same ingredients of the same contents as mentioned above is sprayed to the surface of the metal under the same spraying condition after the carbon film is dried, wherein a primary spray-coating thickness is 4 μm, and a secondary spray-coating thickness is 2 μm.

The processed metal net is coated with a prepared cathode paste and is then dried, pressed and dried to obtain a battery cathode. The cathode paste is prepared by mixing 65 wt % of pyrite, 2 wt % of acetylene black, 3 wt % of polytetrafluoroethylene, and 30 wt % of N, N-dimethylformamide. The dried and pressed metal net coated with cathode materials has a thickness of 0.36 mm, and a cathode piece formed through cutting has the size of 180 mm*42 mm (length*width).

Embodiment 4

Different from Embodiment 1, in Embodiment 4, during surface laser processing, the surface of the metal net is processed only with the 50 W laser at the scanning speed of 70 mm/s. Other processes in this comparative embodiment are performed the same as those in Embodiment 1 to prepare the battery cathode.

Embodiment 5

Different from Embodiment 1, in Embodiment 5, during surface laser processing, the surface of the metal net is processed with the 700 W laser at the scanning speed of 500 mm/s first, then with the 3 W laser at the scanning speed of 800 mm/s, and finally the 50 W laser at the scanning speed of 70 mm/s. Other processes in this comparative embodiment are performed the same as those in Embodiment 1 to prepare the battery cathode.

Embodiment 6

Different from Embodiment 1, in Embodiment 6, no carbon film is formed on the metal net, and the metal net is directly coated with the cathode paste after the surface of the metal net is processed with lasers. Other processes in this comparative embodiment are performed the same as those in Embodiment 1 to prepare the battery cathode.

Embodiment 7

Different from Embodiment 1, in Embodiment 7, conductive carbon materials are sprayed only once, the emulsus solution consisting of 70 wt % of conductive graphite having an average particle size of 400 nm, 1 wt % of hexadecyl trimethyl ammonium bromide, 3 wt % of polyvinylidene fluoride, and 26 wt % of N, N-dimethylformamide is ultrasonically sprayed to the surface of the metal net to form the uniform carbon film, and the carbon film is dried to have a thickness of 6 μm and is then spray-coated with the cathode paste. Other processes in this comparative embodiment are performed the same as those in Embodiment 1 to prepare the battery cathode.

Embodiment 8

Different from Embodiment 1, in Embodiment 8, a spray-coating process of the conductive carbon materials is as follows: the emulsus solution consisting of 70 wt % of conductive graphite having an average particle size of 400 nm, 1 wt % of hexadecyl trimethyl ammonium bromide, 3 wt % of polyvinylidene fluoride, and 26 wt % of N, N-dimethylformamide is ultrasonically sprayed to the surface of the metal net to form the uniform carbon film, the carbon film is dried to have the thickness of 6 μm, then the emulsus solution as mentioned above is ultrasonically sprayed to form a uniform carbon film again, and the carbon film formed later is dried to obtain a second carbon film having a thickness of 3 μm. Other processes in this comparative embodiment are performed the same as those in Embodiment 1 to prepare the battery cathode.

Preparation of the Lithium Battery

The cathode prepared in Embodiments 1-8 as well as the diaphragm, the anode, and the diaphragm is laminated and wound to form a battery cell which is stored in the battery shell, and the electrolyte solution is injected into the battery shell which is then sealed, so that the lithium battery is prepared. The diaphragm is polyethylene micro-porous diaphragm and has a thickness of 50 μm. The anode is a metal sheet made from lithium metals, is identical with the cathode in length*width size, and has a thickness of 150 μm. The electrolyte solution is a bis(trifluoromethane)sulfonimide lithium salt-propylene carbonate system at the density of 5 mol/L.

Performance Analysis of Lithium Batteries

The internal resistance, discharge capacity, and discharge capacity after storage of the batteries prepared in Embodiments 1-8 are measured. The discharge capacity: each battery is continuously discharged in a 24h/d manner at a constant current of 100 mA at the indoor temperature to a final voltage is 0.9V, and then the discharge capacity is measured. Generally, storage at 71° C. for a week is equivalent to storage at the normal temperature for a year, the batteries prepared in Embodiments 1-8 are stored at 71° C. for 8 weeks and then are discharged in the 24h/d manner at the constant current of 100 mA at the normal temperature to the final voltage of 0.9V, and then the discharge capacity after storage is measured. The experimental data is shown in Table 1. It should be noted that 10 batteries are tested, and the values in Table 1 are average values of the 10 batteries.

TABLE 1

Performance analysis of batteries prepared in Embodiments 1-8

| | Internal resistances of batteries Ω | Discharge capacity mAh | Discharge capacity after storage mAh |
|---|---|---|---|
| Battery of Embodiment 1 | 0.432 | 2985 | 2895 |
| Battery of Embodiment 2 | 0.451 | 2954 | 2865 |
| Battery of Embodiment 3 | 0.449 | 2950 | 2830 |
| Battery of Embodiment 4 | 0.621 | 2789 | 2565 |
| Battery of Embodiment 5 | 0.600 | 2856 | 2598 |
| Battery of Embodiment 6 | 0.652 | 2716 | 2118 |
| Battery of Embodiment 7 | 0.595 | 2880 | 2361 |
| Battery of Embodiment 8 | 0.525 | 2930 | 2490 |

The cathode of the battery in Embodiment 4 is processed with laser only once in the preparation process; the cathode of the battery in Embodiment 5 is processed with the 700 W laser first, is then processed with the 3 W laser, and is finally processed with the 50 W laser in the laser processing process; no carbon film is formed on the metal net of the cathode in Embodiment 6; the metal net of the cathode in Embodiment 7 is spray-coated with only one carbon film; and the metal net of the cathode in Embodiment 8 is spray-coated with two carbon films having identical particle sizes. The batteries prepared in Embodiments 4-8 show the performance obviously lower than that of the battery prepared in Embodiment 1 in the performance tests.

The specific embodiments described herein are only used for illustratively explaining the spirit of the invention. Variously modifications, supplements, or similar substitutions of these specific embodiments can be made by those skilled in the art without deviating from the spirit of the invention and the scope defined by the appended claims of the invention.

What is claimed is:

1. A process for preparing a cathode of a lithium battery, comprising the following steps:
    (a) longitudinally punching a metal band to form irregular filamentous holes, horizontally stretching the metal band, and performing compaction to make a metal net having the irregular filamentous holes;
    (b) after the metal net is cleaned and dried, processing a surface of the metal net with a laser powered at less than 5 W, a laser powered at 500 to 1000 W, and a laser powered at 10 to 100 W sequentially; and
    (c) coating the metal net, having the surface processed with the lasers, with a prepared cathode paste, and drying, pressing, and cutting the metal net to obtain a battery cathode.

2. The process for preparing a cathode of a lithium battery according to claim 1, wherein a metal is one of stainless steel, platinum, aluminum, nickel, copper, and nickel-plated stainless steel, and after being compacted, the metal net has a thickness of 0.05 to 0.15 mm.

3. The process for preparing a cathode of a lithium battery according to claim 1, wherein the irregular filamentous holes longitudinally punched in the metal band have a volume accounting for 60% to 85% of a total volume of the metal band and have a volume accounting for 80% to 92% of the total volume of the metal band after being horizontally stretched.

4. The process for preparing a cathode of a lithium battery according to claim 1, wherein a scanning speed of the laser powered at less than 5 W is 500 to 1000 mm/s, a scanning speed of the laser powered at 500-1000 W is 400 to 800 mm/s, and a scanning speed of the laser powered at 10-100 W is 50-100 mm/s.

5. The process for preparing a cathode of a lithium battery according to claim 1, wherein before the metal net having the surface processed with the lasers is coated with the cathode paste, the surface of the metal net is primarily spray-coated with a conductive carbon material having an average particle size of 300 to 500 nm first, is secondly spray-coated with a conductive carbon material having an average particle size of 10 to 50 nm after being dried, and is then coated with the paste after being dried.

6. The process for preparing a cathode of a lithium battery according to claim 5, wherein a primary spray-coated thickness is 3-7 μm, and a secondary spray-coated thickness is 2 to 5 μm.

7. The process for preparing a cathode of a lithium battery according to claim 1, wherein the cathode paste contains, by mass, 65% to 75% of pyrite, 2% to 5% of conductive agents, 2% to 5% of bonding agents, and 20% to 30% of solvents.

8. The process for preparing a cathode of a lithium battery according to claim 7, wherein the conductive agents are one or more of acetylene black, graphite, ketjen black, carbon fibers, and carbon nanotubes.

9. The process for preparing a cathode of a lithium battery according to claim 7, wherein the bonding agents are one or more of polyvinylidene fluoride, polytetrafluoroethylene, styrene butadiene rubber, sodium carboxymethylcellulose, polyacrylonitrile, and polyacrylate.

10. A lithium battery, comprising an anode, a cathode, an electrolyte solution, a diaphragm, and a shell, wherein the cathode is prepared through the process according to claim 1, and the anode is a metal sheet or a metal net which is made from lithium metals or lithium alloys.

* * * * *